Feb. 8, 1966  H. A. HINSCH  3,233,764
TRANSPORTING DEVICES
Filed Nov. 13, 1962
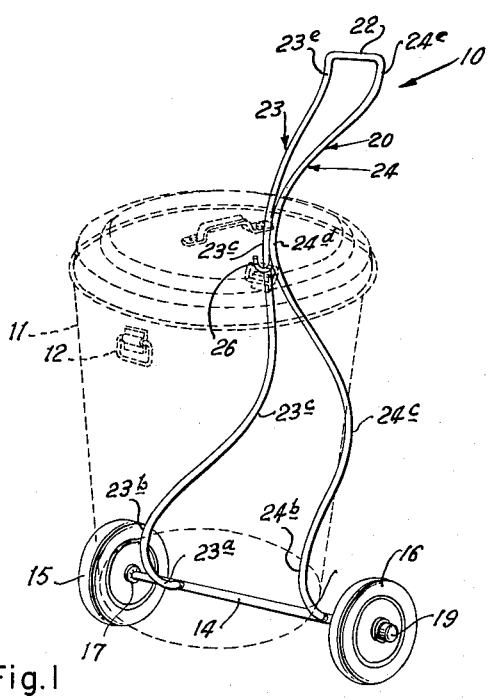
Fig. 1
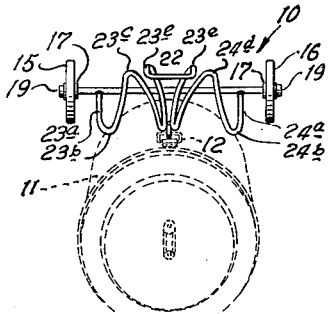
Fig. 2
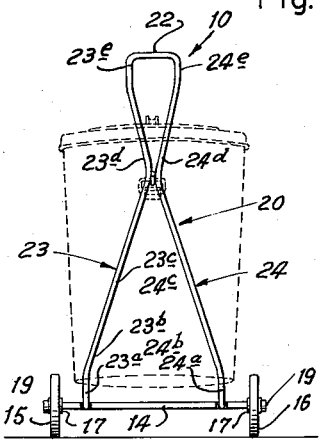
Fig. 3
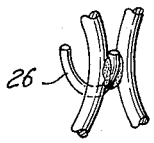
Fig. 6
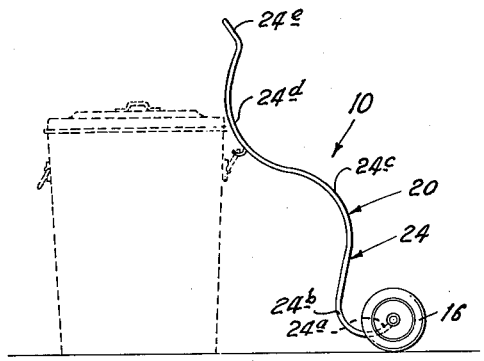
Fig. 4
Fig. 7
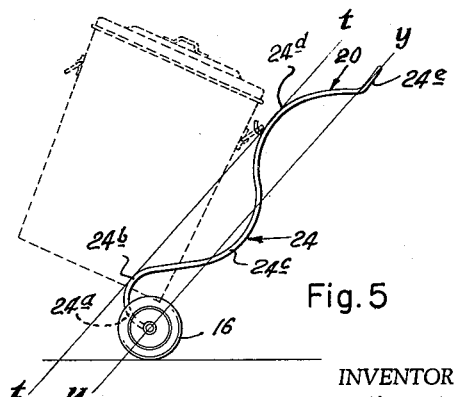
Fig. 5
INVENTOR
Henry A. Hinsch
BY *Hastings Ackley and Walter J. Jaquin*
ATTORNEYS 3,233,764
TRANSPORTING DEVICES
Henry A. Hinsch, Dallas, Tex., assignor to
Laurence G. Lenzen, Dallas, Tex.
Filed Nov. 13, 1962, Ser. No. 236,856
1 Claim. (Cl. 214—384)

This invention relates to transporting devices and more particularly to transporting devices for transporting containers, such as garbage cans, and the like.

An object of the invention is to provide a new and improved transporting device which permits lifting or loading and unloading of containers, such as garbage cans and the like, onto and off the transporting device with a minimum of exertion and with a minimum of manipulation of the container itself.

Another object is to provide a transporting device having a support or hook means engageable with a handle of a container, such as a garbage can, by means of which the container may be raised off the ground and loaded onto the transporting device, without the necessity of any prior lifting or tilting of the container, and with laterally spaced support means for contacting and holding lower portions of the container against displacement when the container is on the transporting device, the container being held in substantially upright position at all times during such loading, transporting and unloading so that spilling of the contents of the container is prevented.

Still another object is to provide a transporting device wherein the points of contact or engagement of the support means with the container held by the hook are above the shaft when the hand truck is in a rearwardly tilted or inclined position, as during the movement thereof from one location to another, whereby a relatively small force is required to hold the hand truck in such inclined position.

A further object of the invention is to provide a wheeled hand truck which is usable for transporting containers, such as garbage cans, of different sizes and configurations.

A still further object is to provide a two wheeled hand truck having a frame connected to a horizontal connecting member or shaft on which the wheels are rotatable and having hook means for engaging the handle of a container, such as a garbage can, when the container is in upright vertical position on the ground and wherein the truck frame provides a pair of spaced contact or support surfaces for engaging lower portions of the container whereby lifting or positioning of the garbage can on the hand truck may be accomplished by engagement of the hook with the handle of the garbage can and rearward pivotal movement of the frame by a force applied to the upper end of the frame, the support surfaces engaging the lower portions of the garbage can as the garbage can is so lifted on the truck to hold the garbage can against movement on the truck.

A still further object is to provide a hand truck having a frame rigid with the shaft on which the wheels are mounted, the frame having laterally spaced upwardly extending side sections which converge upwardly toward one another to a hook secured thereto and projecting forwardly and upwardly from the frame, the hook being engageable with the handle of a garbage can to hold the can on the truck, the side sections diverging from the hook to a container being receivable between the lower portions of the two side sections of the frame.

Another object is to provide a hand truck of the type described wherein the upwardly convergent and then upwardly divergent side sections of the truck frame curve rearwardly and forwardly at various positions along and throughout substantially their full lengths to increase the rigidity and strength of the frame and to cause the points of contact or support of the lower portion of the container held on the hand truck by means of the hook to be positioned above the wheel shaft of the hand truck when the truck is in its full rearwardly inclined position during transporting of the container whereby the hand truck may be easily held in substantially balanced position against upward or downward pivotal movement during the transporting of a container.

Additional objects and advantages of the invention will be readily apparent from the reading of the following description of a device constructed in accordance with the invention, and reference to the accompanying drawings thereof, wherein:

FIGURE 1 is a perspective view of a hand truck embodying the invention showing the frame of the truck in substantially vertical position and the position in which is held a garbage can supported thereby;

FIGURE 2 is a top view of the hand truck when the frame thereof is in such position that the plane passing through the handle section of the frame and through the wheel shaft is inclined rearwardly at a small angle from the vertical;

FIGURE 3 is a front view of the hand truck when it is in the rearwardly inclined position illustrated in FIGURE 2;

FIGURE 4 is a side view showing the position of the truck at the time the hook of the hand truck is engaged with a handle of a garbage can immediately prior to the lifting or loading of the garbage can onto the hand truck or immediately after the lowering or unloading of the can from the hand truck;

FIGURE 5 is a side view of the hand truck when it is in the fully rearwardly inclined position in which it is held while it is being moved to transport a garbage can from one location to another;

FIGURE 6 is a fragmentary perspective view of the hook of the truck frame and the side sections of the frame to which it is secured; and FIGURE 7 is a fragmentary perspective exploded view showing the manner in which the wheels are mounted on the shaft of the truck.

Referring now to the drawings, the hand truck 10 for transporting containers, such as a garbage can 11 having one or more handles 12 adjacent its upper end, includes a horizontal rod member or shaft 14 having a pair of wheels 15 and 16 rotatably mounted thereon adjacent opposite ends thereof. Each of the wheels is held against inward movement on the shaft by any suitable stop means such as the collar or ring 17 which has prong means 18 movable into locking engagement with the shaft after the ring has been placed on the shaft at a desired position spaced from the adjacent end of the shaft. The hub caps 19 on the outer ends of the shaft limit outward movement of the wheels on the shaft. The hub caps 19 may be of a well known type and have locking means which lock the caps on the shaft to prevent removal of the hub caps from the shaft once the hub caps have been telescoped over the ends of the shaft.

The frame 20 of the hand truck is preferably formed of a single rod-shaped member whose middle horizontal section 22 forms a handle and extends substantially parallel to the shaft 14 and a pair of side sections 23 and 24 which extend from opposite ends of the handle section to the shaft and whose lower ends are rigidly secured to the main shaft 14 in spaced relation to one another and inwardly of the wheels. The two side sections have substantially parallel end portions 23a and 24a which, when the frame is in the substantially vertical position illustrated in FIGURES 1, 3 and 4, extend forwardly and then upwardly from the main shaft 14 and relative to the plane Y—Y extending through the shaft 14 and the handle section 22 of the frame; upwardly convergent lower forward arcuate or convex portions 23b and 24b which curve upwardly and forwardly from the end portions 23a and 24b and away from the plane Y—Y and then upwardly and rearwardly to the plane Y—Y; intermediate rear arcuate or convex portions 23c and 24c which curve from the lower forward portions and the plane Y—Y convergently rearwardly and upwardly and then upwardly and forwardly to the plane Y—Y; upper forward curved or convex portions 23d and 24d which curve convergently upwardly and forwardly from the intermediate portions and the plane Y—Y to positions adjacent one another and then curve divergently rearwardly and upwardly to the plane Y—Y; and substantially parallel portions 23e and 24e which extend from the upper forward portions to opposite ends of the horizontal handle section 22.

The extreme forward surfaces of the lower forward portions 23b and 24b of the two side sections of the main frame and the extreme forward surfaces of the upper forward portions 23d and 24d lie in a plane t—t which is substantially parallel to and spaced forwardly from the plane Y—Y so that the hook 26 of the hand truck extends forwardly of the plane t—t. The rear portion of the hook extends between and is rigidly secured to the upper forward arcuate portions 23d and 24d, at approximately the point of closest proximity of these portions to one another, in any suitable manner as by welding, the main frame being of a single piece and having its side sections curving upwardly first forwardly and then rearwardly and then forwardly and then rearwardly, the upper and lower ends of such side sections being secured to one another by means of the shaft 18 and the handle section 22, respectively, the side sections lying in upwardly convergent planes below the point of closest proximity of the upper forward curved portions and in upwardly divergent planes from such point to locations spaced from the ends thereof and the handle section, is very rigid and strong, and thus is capable of supporting heavy loads without deformation or failure.

In use, when it is desired to lift a container such as the garbage can 11, and transport it to another location, the hand truck 10 is pivoted forwardly and downwardly to the position illustrated in FIGURE 4 wherein its hook is in position to engage the handle 12 of the can. A rearward force or pull then imparted to the handle section 22 of the frame, when the hook is in engagement with the handle, then causes the lower end of the hand truck to move forwardly toward the can and simultaneously cause forward upward pivotal movement of the rear portion of the can. The rotatable mounting of the wheels of course facilitates such movement of the lower end of the hand truck and the lifting of the container until the lower forward portions 23b and 24b are moved to positions on opposite sides of the container in engagement with spaced portions thereof whereupon further rearward pivotal movement of the hand truck lifts the can free of the ground. Continued rearward pivotal movement of the hand truck about the shaft 14 moves the hand truck to the position illustrated in FIGURE 5 wherein the plane Y—Y extends at an angle of substantially forty-five degrees from the hroizontal. The can may then be easily moved to any desired location by rolling the hand truck on its wheels to such location. At the desired location, the hand truck is pivoted forwardly and upwardly about the shaft 14 and, if desired, the person using the hand truck may hold the lower end of the hand truck against rearward rolling movement by engaging the shaft 14 with his foot until the forward end of the bottom of the can engages the ground during such forward upward and then downward movement of the hand truck. The lower end of the hand truck then rolls rearwardly during this movement until the rear end of the bottom of the can comes to rest on the ground. At this time the can and the hand truck are again in the positions illustrated in FIGURE 4 and the hook 26 is readily disengaged from the handle 12.

During the entire operation of lifting of the can onto the hand truck, its transportation from one location to another and its unloading from the hand truck, the person using the hand truck does not have to directly lift or raise the can, as would be required if a conventional hand truck which has a platform or footpiece which must be inserted beneath the lower end of the container or other object to be transported. As a result the person employing the hand truck embodying the invention does not need to bodily lift or tilt the container or come into contact therewith since the containers, such as the garbage cans 11, may of course be dirty and quite heavy.

Moreover, it will be apparent that the mechanical advantage of the hand truck permits the loading and unloading of the heavy containers onto and from the hand truck with a minimum of force since obviously the distance or length of the lever arm, between the point of contact of the hook 26 with the handle 12 of the container and the point of contact of the wheel with the ground, or between the point of contact of the hook with the handle and the axis of rotation of the wheel, is at all times shorter than the distance or length of the lever arm between the point of contact of the wheels with the ground and the upper handle section 22 of the frame of the hand cart or between the axis of rotation of the wheels and the handle section.

It will also be apparent that the container is engaged by the hand truck at three spaced points and is therefore securely held against undesired or accidental movement on the hand truck, the weight of the container tending to hold the container between the upwardly and inwardly inclined spaced portions 23b and 24b of the side sections of the container and such sections by engagement with the lateral oppositely facing surfaces of the container and to prevent lateral displacement of the container on the truck during its transport from position to position and during its loading and unloading movement.

It will further be seen that the wheels are preferably so spaced that they are positioned on opposite sides and spaced from extreme side portions or surfaces of the containers and outwardly of the side sections of the frame and the hand truck is thus stabilized against undesired motion during loading, unloading and transporting operations.

It will further be noted that the hand truck may be employed to transport containers of different sizes since the lower forward curved portions 23b and 24b converge upwardly toward one another so that the lower portion of a container 11 of small diameter will be engaged by such portions at points located somewhat higher and further rearwardly on such portions than are located at such points of contact with a can of larger diameter.

It will also be noted that if the container is of great height, the main frame of the hand cart assumes a more nearly vertical position when its hook 26 is in position to engage the handle 24 so that the upper forward curved portions 23d and 24d do not engage the upper portions of such container and prevent the engagement of the hook 26 with the handle 12 of such container. Such upper forward portions of the frame above the hook will extend over the upper end of a container of shorter height when the hook 26 is in position to engage the handle 12 of such shorter container and will not hinder or prevent the engagement of the hook with such handle. It will therefore be apparent that the truck may be used to lift, transport and unload containers, such as garbage cans, of various dimensions.

It will further be apparent that due to the location of the lower forward portions 23a and 23b of the side sections forwardly of the plane Y—Y which extends through the handle section 22 and the axis of rotation of the wheel, the points of contact of the container with such portions are substantially directly above and spaced from the shaft 14 and the point of contact of the hook with the handle is above and behind the axis of rotation of the wheels so that the container is in a rearwardly tilted position but not to the degree which would cause spilling of its contents if it had no cover and so that the center of gravity of the container and its contents is disposed forward of the axis of rotation of the wheels and between the axis of rotation and the point of contact of the hook with the handle when the plane Y—Y is disposed substantially forty-five degrees from the vertical so that a slight downward force exerted on the handle is sufficient to hold the hand truck in a proper rearwardly inclined position for movement from one location to another regardless of the combined weight of the container and its contents.

It will further be apparent that due to the provision of the frame of the hand truck having the illustrated and described structure and configuration, the container supported by the hand truck is positioned forward and above the legs and feet of the person moving the hand truck when the hand truck is in such rearwardly inclined position during the use thereof that the plane Y—Y is at an angle of approximately forty-five degrees from the vertical and the weight of the container tends to exert a small force tending to pivot the frame upwardly and forwardly about the axis of rotation of the wheels which can be easily balanced or overcome by a small downward force applied to the handle section 22 while at the same time a forward force may be exerted on the handle section to cause the hand truck to roll forwardly along the ground from one position to another.

It will further be apparent that since the wheels are free to rotate about the axis of the shaft 14 and roll along the ground, any rearwardly acting force applied to the handle section 22 when any portion of the bottom end of the container rests on a supporting surface will cause the lower portions of the hand truck to move forwardly toward the container while the frame pivots upwardly and rearwardly, the wheels rolling on the supporting surface to facilitate such movement, since the friction between the bottom end of the container and the surface is of course relatively great so that the container itself is not dragged along the ground during loading but is merely pivoted about its forward edge of its bottom end until it is fully raised from the ground. Conversely, during unloading operations, once the frame has pivoted forwardly to a position wherein the forward edge of the bottom end of the container rests on the supporting surface the friction between the supporting surface and the container will prevent movement of the container on the ground and the weight of the container will cause the lower portion of the hand truck to move rearwardly away from the container as the frame is permitted to pivot forward and downwardly about the axis of rotation of the wheels until the full weight of the container and its contents is supported by such surface.

It will be apparent that the combination of a container, such as the can 11, and the hand truck 20 may be used in lieu of a wheelbarrow or the like to transport various materials, such as trash, grass cuttings, sand, soil and the like, from one location to another, as well as to move such containers as garbage cans from one location to another, that such movement or transport of the containers from one location to another can be accomplished without any contact with the container or without the necessity of directly lifting or tilting the container in any manner in order to load it or position it on the hand truck or to unload it from the hand truck, and that the force required to be applied to the handle section during loading and unloading operations is relatively small as compared to the weight of the container so that persons of relatively weak strength may employ the hand truck to move heavy containers.

It will also be apparent that while the hand truck embodying the invention has been described in connection with the transportation of a container, it may be used to transport any article or object whose lower portion is receivable between the wheels and engageable by the side sections of the hand truck and which has an external handle or other means engageable by the hook of the hand truck and located on such article or object at a level or height above its supporting surface somewhat lower than the height or level of the hook of the hand truck from the supporting surface when the frame is in a position wherein the plane Y—Y is vertical.

The foregoing description of the invention is explanatory only, and changes in the details of the construction illustrated may be made by those skilled in the art, within the scope of the appended claim, without departing from the spirit of the invention.

What is claimed and desired to be secured by Letters Patent is:

A hand truck including: a horizontal support member; a pair of wheels rotatably mounted on said horizontal member adjacent the ends thereof; and a frame, said frame including a pair of side sections having lower ends connected to said horizontal member and a handle section connecting the upper ends of said side sections, said side sections converging upwardly to a point intermediate said ends and extending divergently from said point to said handle section, each of said side sections having a lower forward convex portion, an upper forward convex portion and an intermediate rear convex portion connecting the upper and lower forward portions, the extreme forward surfaces of said lower and upper forward convex portions of said side sections being disposed in a first plane substantially parallel to and spaced forwardly from a second plane extending through the axis of rotation of said wheels and said handle section, said forward upper and lower portions being disposed between said planes and said intermediate convex portions being disposed rearwardly of said second plane; and a hook projecting forwardly of said first plane, said lower convex portions providing inwardly facing laterally spaced surfaces engageable with oppositely facing surfaces of an object, said side sections and said hook being rigidly secured together adjacent said point.

References Cited by the Examiner
UNITED STATES PATENTS

| 1,155,081 | 9/1915 | More | 214—383 |
| 2,251,591 | 8/1941 | Looney | 214—384 |
| 3,108,702 | 10/1963 | Chesney | 214—375 |

FOREIGN PATENTS

| 533,918 | 2/1941 | Great Britain. |

GERALD M. FORLENZA, *Primary Examiner.*

MORRIS TEMIN, HUGO O. SCHULZ, *Examiners.*